No. 665,139. Patented Jan. 1, 1901.
B. C. SHIPMAN.
CONTROL OF ELECTRIC MOTORS.
(Application filed May 29, 1900.)

(No Model.) 4 Sheets—Sheet 1.

WITNESSES:
G. M. Powell,
B. M. Smith.

INVENTOR
B. C. Shipman,
BY
Geo. H. Parmelee
his ATTORNEY.

THE NORRIS PETERS CO., PHOTO-LITHO., WASHINGTON, D. C.

No. 665,139. Patented Jan. 1, 1901.
B. C. SHIPMAN.
CONTROL OF ELECTRIC MOTORS.
(Application filed May 29, 1900.)
(No Model.) 4 Sheets—Sheet 2.

No. 665,139. Patented Jan. 1, 1901.
B. C. SHIPMAN.
CONTROL OF ELECTRIC MOTORS.
(Application filed May 29, 1900.)
(No Model.) 4 Sheets—Sheet 4.

WITNESSES:
G. M. Powell.
B. M. Smith.

INVENTOR
B. C. Shipman
BY
Geo. H. Parmelee,
his ATTORNEY.

THE NORRIS PETERS CO., PHOTO-LITHO., WASHINGTON, D. C.

UNITED STATES PATENT OFFICE.

BENNET CARROLL SHIPMAN, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 665,139, dated January 1, 1901.

Original application filed August 5, 1899, Serial No. 726,340. Divided and this application filed May 29, 1900. Serial No. 18,387.

(No model.)

*To all whom it may concern:*

Be it known that I, BENNET CARROLL SHIPMAN, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

This invention has relation to apparatus for the control of electric motors, and is more particularly designed to provide apparatus for use in carrying into effect the system of control described and claimed in my pending application, Serial No. 726,340, of which the present application is a division. That system, generally described, consists in starting the motors as series motors and changing them over to shunt-motors after they have reached a certain speed. To attain this purpose and yet work the motors practically and with a reasonable efficiency at all times, I provide a motor having different sets of field-windings which in the starting positions are arranged in multiple with each other and in series with the armatures; but in the positions of higher speed these different field-coils are placed in series with each other and in shunt to the armature. This arrangement makes it possible to provide the proper field excitation without either abnormally increasing the size of the motors or, vice versa, without too much heating of the field-coils at any time, while at the same time the wiring of the field-coils can be arranged so that the motor will be working efficiently whether it is being operated as a series or a shunt motor. With my preferred arrangement I provide a multipolar motor and connect the terminals of each of the coils for the respective poles to my switching apparatus, whereby the coils for the different poles may be all in series when the motor is to be used as a shunt-motor, whereas they will be all in multiple when the motor is to be used as a series motor. This, however, is not essential to my invention, as I may attain this purpose by having multiple windings on the same cores, if I desire, and, indeed, this construction may for some forms of motors—as, for example, a bipolar motor—be preferable.

As the change of so many connections at different steps of the control system would require a very large apparatus if constructed in the ordinary manner, my invention further consists in an improved construction of the controller by which I am enabled to make all the necessary changes without providing too heavy an apparatus or putting too much work on the operator, and this portion of my invention resides principally in the provision of a pair of independent field commutating-switches which are automatically actuated by the regular control-switch at a few only of the positions of the latter.

Another part of my invention resides in the provision of means for automatically opening the circuit to the controller when the main circuit is interrupted, and to this end I provide a switch through which the current between the controller and one or other side of the circuit must pass, which switch is held closed by an electromagnet connected to the main circuit. If the main circuit should be interrupted when the motors are being used as shunt-motors and then become active again before the operator has opened the circuits to the motors, the latter would take an abnormal rush of current, because the field strength of shunt-motors will not build up as rapidly as that of series motors, and thereby produce a counter electromotive force. By the provision of my switch this danger is eliminated and the main circuit is kept open by this switch until the operator turns the controller to the "off" position, means being provided to automatically close this safety-switch when the controller is at the off position.

Another portion of my invention consists in certain more specific features in reference to the construction, arrangement, and combination of the different parts of my apparatus. The nature of these features will appear more fully hereinafter when describing the detailed arrangement shown in the drawings.

Referring to the drawings, Figs. 8 to 20, inclusive, are diagrammatical representations of the most important of the combinations effected by the operation of the controller.

A represents the controller-casing, parts only of which are shown in the different views, the remainder of the casing being removed to more clearly show the construction of the different switches.

B is the shaft of the ordinary control-drum and is mounted in the usual bearings at the top and bottom of the controller-casing.

C represents the control-drum, which carries contact-segments which engage with a number of fixed contact-fingers C'. The construction of the controller-drum and the contact-fingers is of the usual type and need not be further considered.

Figure 1:
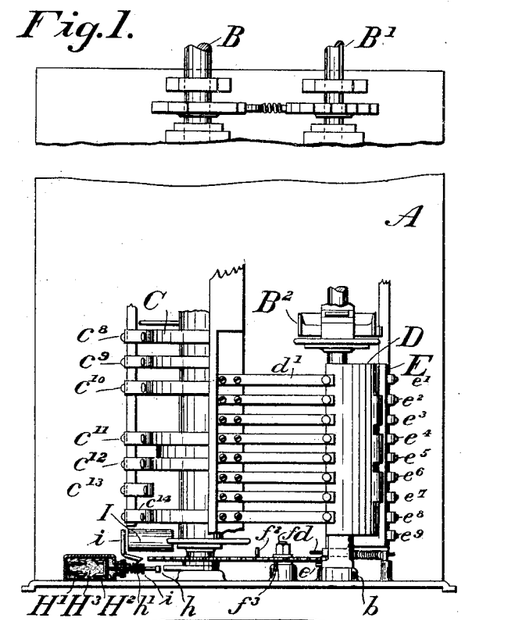
Figure 1 is a front elevation of a controller constructed in accordance with my invention, portions of the same being broken away to more clearly show the novel parts of the apparatus.
Figure 2:
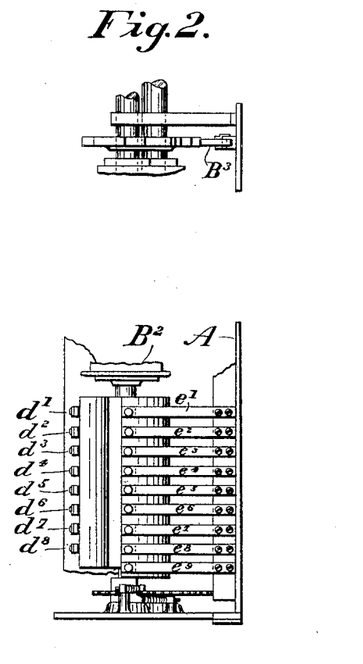
Fig. 2 is a side elevation of a similar character.

B' represents the shaft of the reversing-switch. A portion of the drum of the reversing-switch is shown at B² in Figs. 1 and 2; but this also is of the usual type of construction. The shaft B' is mounted in the usual bearings in the top of the controller-casing and is extended from the lower end of the reversing-switch B² to a suitable bearing $b$ on the base of the controller-casing. The lower part of this shaft is used to carry loosely mounted upon it the segments D and E of the field commutating-switches with which the contact-fingers $d'$ $d^2$, &c., and $e'$ $e^2$, &c., engage, respectively. B³ indicates the interlocking and step-by-step device, which is also of a known type.

Figure 3:
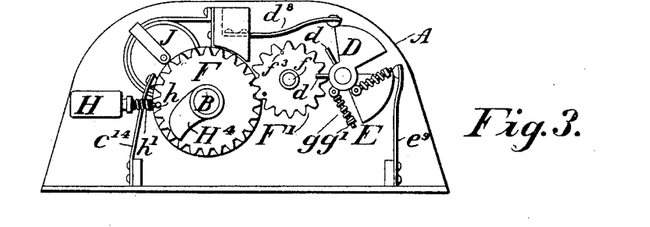
Fig. 3 is an inverted plan view of Fig. 1 with the base of the controller-casing removed.
Figure 4:
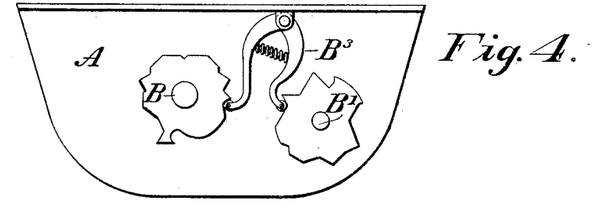
Fig. 4 is a plan view of the interlocking and step-by-step device.
Figure 5:
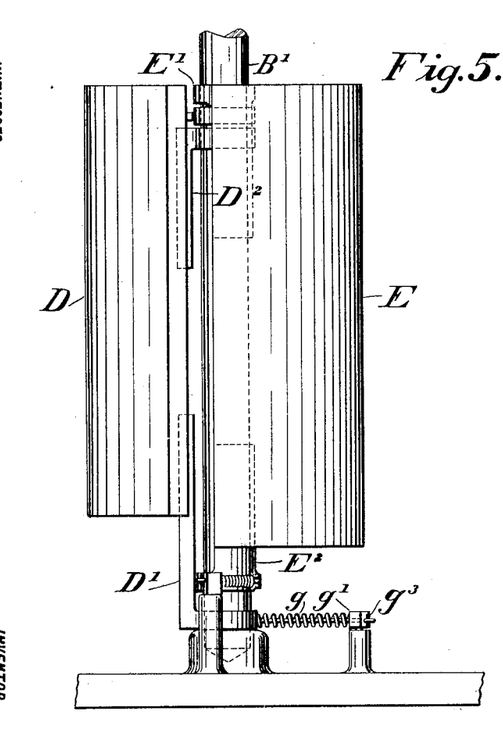
Fig. 5 is an enlarged view of portions of the field commutating-switches.
Figure 6:
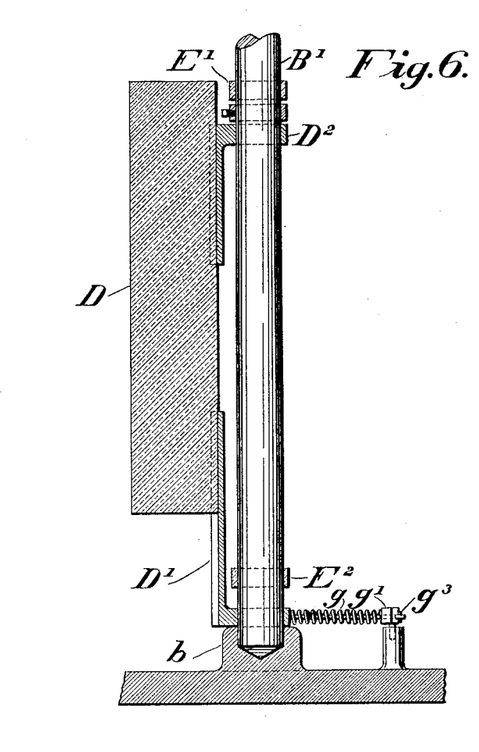
Fig. 6 is a vertical section of Fig. 5.

The moving portion of the field commutating-switch D is a segment having secured to it a sleeving-lug D', Fig. 6, which rests upon the top of the bearing-block $b$. This sleeving-lug supports the segment D thereon, a second sleeving-lug D² being provided, which holds the said segment to its proper center. The segment E of the other field commutating-switch has similar sleeving-lugs E' and E², the former resting on a collar B³, secured to the sleeving-lug D². The field commutating-switches have two positions, and they are moved from one to the other of the operating positions at predetermined positions of the control-drum C, the instrumentalities for effecting this change being as follows: Upon the shaft B of the control-drum is rigidly mounted a gear-wheel F, Figs. 1, 2, and 3, which rotates with the shaft B. This gear F meshes with a smaller gear F', carried by a short shaft $f$, mounted in a bearing $f'$ on the base of the controller-casing. Projecting upwardly and downwardly from the gear F' are pins $f^2$ and $f^3$, respectively. Projecting from the sleeving-lug D' are arms $d$, which are in the line of movement of the pin $f^3$, and projecting from the sleeving-lug E² are arms $e$, which are adapted to be engaged by the pin $f^2$. When the controller is at a predetermined position, pin $f^3$ engages one of the arms $d$, thereby turning the segment D about the shaft B as a center, and in order that the movement shall be a quick and positive one I provide a spring $g$, bearing at one end against the sleeving-lug D' and at its other end against a small pivoted block $g'$, Fig. 6, a rod $g^2$ being connected to the sleeving-lug D' and passing through the spring and pivot-block $g'$, the range of movement being limited by a cotter-pin $g^3$. When the segment D is moved past the center, this spring, against the action of which the pin $f^3$ at first operates, acts upon the sleeving-lug D', so that the segment D is thrown to its extreme position. In other words, the spring $g$ will act to either side of a position central to the two operative positions of the switch. In the reverse movement of the control-drum the pin $f^3$ will act upon the second of the arms $d$ to exactly reverse its operation and return segment D to its first position. At another position of the controller pin $f^2$ will act upon one of the arms $e$ to actuate the segment E in the same manner and by the aid of the same spring connections as I have just described.

The safety device to which I have referred generally in the first part of this specification consists, essentially, of a switch, an electromagnet energized by the main circuit or a shunt from the main circuit, so as to maintain the switch closed when the magnet is energized, and a part moving with the control-switch and adapted to close the switch and maintain it closed when the control-switch is at the off position. The preferred form, which I show, (see particularly Figs. 1 and 3,) is constructed as follows: A vessel H contains the stationary switch-terminals H' and the moving switch-terminals H², all of said terminals being preferably immersed in oil H³ or an equivalent arc-extinguishing material. This vessel H is preferably hermetically sealed by any suitable means. The movable terminals H² are carried on the end of a piston $h$, the end of which is in line of movement of a cam H⁴, which is movable with the shaft B of the control-switch. This cam H⁴ engages with the end of the piston $h$ only when the controller is at the off position. By this arrangement if the switch automatically opens when the controller is in an operative position it will not be closed until the operator has turned his handle to the off position, and in case of a continued failure of the main circuit it will at once open again as soon as the cam H⁴ leaves the end of the piston $h$, so that the operator's attempt to actuate the motors when the main circuit is still interrupted will do no damage. The means for thus opening the switch when the main circuit is interrupted and the cam H⁴ is out of engagement with the piston is a compression-spring $h'$. I is an electromagnet whose energizing-coil is preferably a shunt from the main circuit, as clearly shown in Fig. 7. Whenever this magnet attracts the armature $i$, it engages the collar $i'$ on the piston $h$ when the terminals H' and H² are in engagement. So long, therefore, as the main circuit of the switch is uninterrupted the pivoted armature $i$ will maintain the closure of the switch by overcoming the tendency of the spring $h'$ to open the same. Many of the ordinary forms of magnetic circuit-breakers may be used in this connection instead of the specific form which I have shown, the novelty in my safety device consisting in its combination with the control-switch in the manner set forth, so that the latter automatically closes the switch when at the off position, though having no effect upon the switch at any other position.

At J, I have indicated an electromagnetic blow-out, which, however, does not form any part of the present invention. This blow-out, as shown, comprises two parallel coils (see Fig. 7) arranged above and below the first contact-finger $c'$ of the control-switch, the arcing on the control-switch when breaking the circuit being concentrated at this point, so as to be acted upon by a strong concentrated magnetic field.

Figure 7:
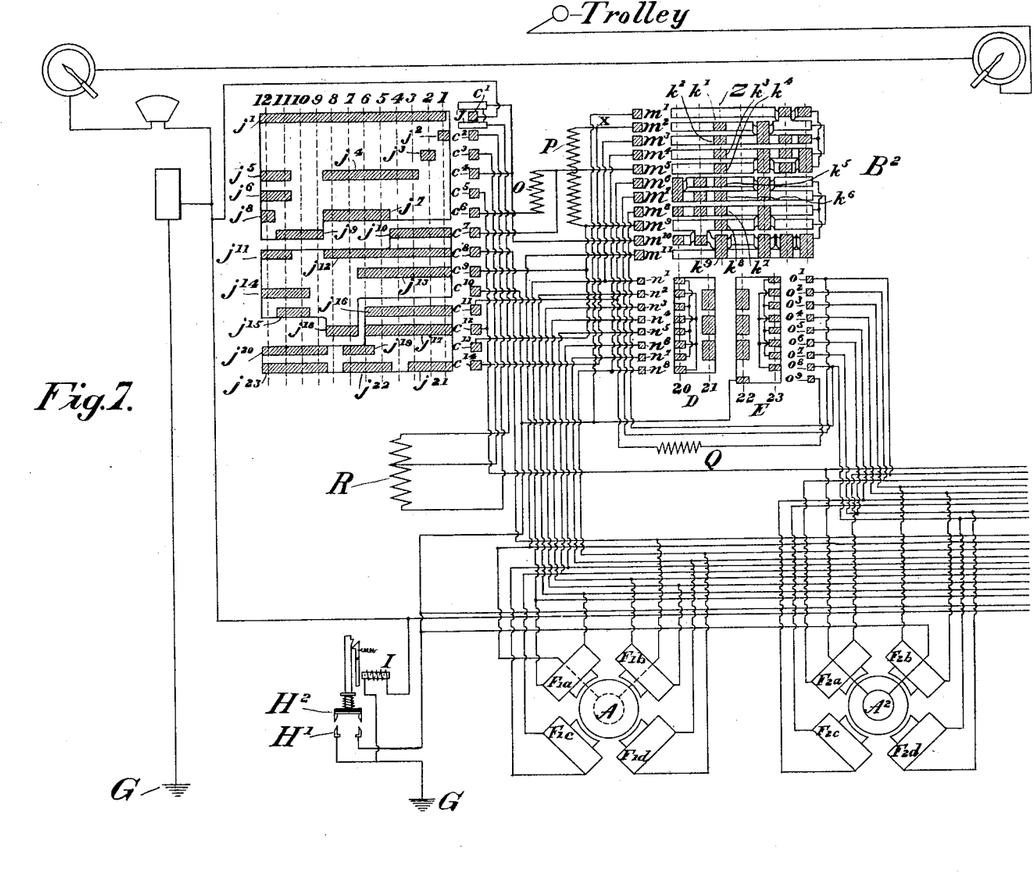
Fig. 7 is a diagrammatical representation of the circuits.

Turning now to Fig. 7, in which such of the parts which I have referred to in previous descriptions as are here shown are marked with the same reference-letters which I have heretofore used, $k'$ to $k^9$, inclusive, represent the contact-points of the circuit of the reversing and cut-out switch B² as would be used at the position "go ahead with both motors." This combined reversing and cut-out switch does not differ in principle from that disclosed in the patent to Gustaf Valley, No. 561,839, dated June 9, 1896, and I will therefore not need to describe its construction and operation in detail. It has two positions at which both motors may be used, one in the forward direction and one in the reverse direction, while it has four other positions in which one motor alone may be used in an emergency, either in the forward or backward direction. When one motor is cut out, I prefer to use the control-drum only in the first three of its positions and never use the motor as a shunt-motor. For the purpose, therefore, of describing the novel features of my apparatus it may be assumed that the fingers $m'$ to $m^{11}$, inclusive, are bearing on the line Z of the reversing and cut-out drum, so that the fingers $m^2$ to $m^{11}$, inclusive, are bearing on the contacts $k'$ to $k^9$, inclusive, the interconnections between the latter contacts being clearly shown on the diagram.

$j'$ to $j^{22}$, inclusive, represent the contacts projecting from the drum C of the control-switch, said contacts being interconnected in three groups, the first group including $j'$ to $j^9$, inclusive, the second group $j^{10}$ to $j^{15}$ and $j^{18}$, inclusive, and the third group $j^{16}$, $j^{17}$, and $j^{19}$ to $j^{23}$, inclusive. These contacts engage the fixed contact-fingers $c'$ to $c^{14}$, inclusive, in the usual manner, the latter being connected to the different parts of the circuit, as shown.

The armatures of the two motors are represented as A' and A². The field-coils in my preferred arrangement comprise four field-coils, each for one of the cores of the field-magnet. The field-coils of one motor are represented as F'ᵃ F'ᵇ F'ᶜ F'ᵈ, while those of the other motor are represented as F²ᵃ, F²ᵇ, F²ᶜ, and F²ᵈ.

$n'$ to $n^8$, inclusive, represent the stationary contact-fingers for the segment D of one of the field commutating-switches, while $o'$ to $o^9$, inclusive, represent the fixed contact-fingers for the segment E of the other of the commutating-switches. Each of these segments, as clearly shown in Fig. 7, has a double row of contacts, one of which is adapted to connect the fingers, which are in turn connected with the field-coils of one of the motors, so as to place all the coils in series, while the others are adapted to place all the coils in multiple.

R represents a resistance which I prefer to use at the first two positions of the control-switch to allow for starting the motors in their position of rest in the old rheostatic manner. These positions, however, are not particularly material to my invention and with some motors might readily be dispensed with.

O, P, and Q are three resistances of smaller capacity and higher resistance than resistance R, and these I use in connection with the control of the field strength and the changes of the coupling of the various field-coils, as hereinafter described.

Figure 8:
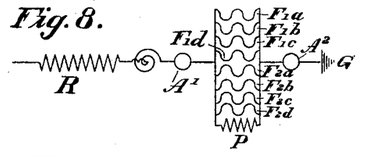

The current from the "trolley" enters through various canopy-switches and the ordinary safety devices carried by an electric-railway car to the finger $c'$ of the control-drum. The various ground connections from the system pass through the terminals H' of the safety-switch, as clearly shown. In the first position of the control-switch the contact-fingers $c'$ to $c^{14}$, inclusive, are bearing on the line 1 of the control-drum development, the fingers $n'$ to $n^8$, inclusive, are bearing on the line 20 of segment D, fingers $o'$ to $o^8$, inclusive, are bearing on the line 23 of segment E, and the terminals H' and H² of safety-switch are closed. The condition of the motors and apparatus while at this position is clearly shown in Fig. 8. The current from the trolley enters at $c'$, passes by contacts $j'$ and $j^2$ to finger $c^2$, thence through resistance R to blow-out coil J, thence to finger $m^{10}$, contact $k^9$, finger $m^{11}$, armature A', finger $c^8$, and contact $j^{12}$. At this point the current divides, going through the eight field-coils of the two motors in multiple and also through the resistance P in multiple. The circuit from $j^{12}$ through the field-coils F'ᵃ, F'ᵇ, F'ᶜ, and F'ᵈ is by means of contact $j^{10}$, finger $c^7$, finger $m^5$, contact $k^4$, contact $k^3$, and finger $m^4$, from which there is one direct connection to field-coil $F'^d$ and one connection by finger $n^8$, which by means of the connection of the contacts on line 20 of segment D effects the connections of the other field-coils $F'^b$, $F'^c$, and $F'^a$ by means of fingers $n^8$, $n^6$, $n^4$, and $n^2$. Return connections from the four said coils are to fingers $n'$, $n^3$, $n^5$, and $n^7$ of contacts on segment D, connecting these altogether. The circuit is then to finger $m^3$, to contacts $k^2$ $k'$, to finger $m^2$, to the point which for convenience I have marked X. The circuit through the four field-coils of the other motor and through the resistance P from the contact $j^{12}$ to the point I have marked X is from contact $j^{12}$ to contact $j^{13}$, finger $c^9$, directly through resistance P to X and also to finger $m^9$, contacts $k^8$ and $k^6$, finger $m^7$, to finger $o'$ of switch E, to coil $F^{2a}$, finger $o'$ being connected by the contacts on line 23 of said switch E to fingers $o^3$, $o^5$, and $o^7$, respectively, which are connected to the positive sides of coils $F^{2b}$, $F^{2c}$, and $F^{2d}$, respectively. The other sides of these coils are connected, respectively, to fingers $o^2$, $o^4$, $o^6$, and $o^8$, which are connected together by the contacts on line 23, so that from the finger $o^8$ the current from this branch of the circuit passes to finger $m^8$, contact $k^7$, contact $k^5$, finger $m^6$, finger $c^{11}$, while the point X is connected to the finger $c^{14}$, so that on the third group of $j$ contacts the eight branch circuits are reunited, leaving by the finger $c^{12}$, passing through armature $A^2$, through terminals $H'$ and $H^2$ to ground. It will thus be seen that the current is passed through the two armatures in series with each other and through the eight field-coils and a supplementary resistance, which are in multiple with each other, but in series with the armatures, while the main resistance R is in circuit, as well as the blow-out J. I may change this, however. The reason I have preferred to provide the resistance P in multiple with the eight field-coils is that it is a very simple method of obtaining proper field strength and efficiency both when the motors are used as series motors and as shunt-motors, because the resistance can be graduated so as to suit any given conditions.

Figure 9:
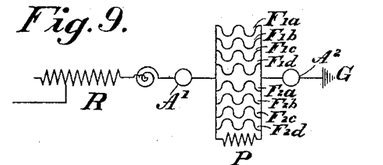

At position 2 of the control-switch the only change effected is that the current passes from contact $j'$ to contact $j^3$ instead of contact $j^2$, whereby a portion of resistance R is cut out. This is shown in Fig. 9.

Figure 10:
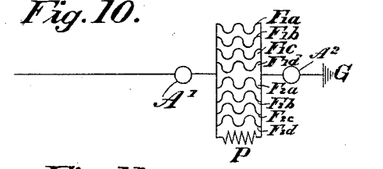

At position 3 of the control-switch the circuit passes from $j'$ to $j^4$ and cuts out the remaining portion of the resistance, thereby producing the combination shown in Fig. 10.

Figures 11, 12:
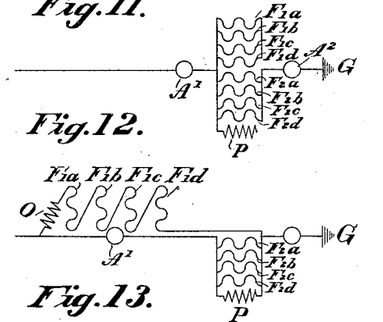

At position 4 of the control-switch finger $c^{14}$ breaks contact with contact $j^{21}$, all the other connections remaining the same. The only result of this is that the circuit between the negative side of $F'$, field-coils, and armature $A^2$, and between the negative side of resistance P and $A^2$ is broken, so that we have the resultant effect as shown in Fig. 11, in which only one motor—viz., the right-hand motor—is doing useful work, although the ohmic resistance of $A'$ is in circuit. This is preferably a pass-over or reorganization position.

The next change is made by one of the field commutating-switches before the control-switch leaves its position, for it is at this point that pin $f^3$ engages one of the triggers $d$, whereby the segment D is thrown so that the contacts on line 21 engage fingers $n^2$ to $n^7$, inclusive. The effect of this change, it will be clearly seen, is to place the four field-coils $F'^a$, $F'^b$, $F'^c$, and $F'^d$ in series with each other. As this is a very transitory step, and as in practice it will take place substantially simultaneously with the step which I will now describe, I have not shown it in a separate diagram. About the time, therefore, that this change is made position 5 of the control-switch is reached, at which finger $c^6$ engages with contact $j^7$, finger $c^7$ breaks engagement with $j^{10}$, and finger $c^{14}$ makes engagement with $j^{22}$.

The result of these changes is that a shunt is established from contact $j'$ to contact $j^7$, to finger $c^6$, through resistance O, finger $m^5$, contact $k^4$, contact $k^2$, finger $m^3$, to field-coil $F'^a$, through the fields in series, because the $n$ fingers are on line 21 of segment D, thence through finger $m^4$, contact $k^3$, contact $k'$, finger $m^2$, finger $c^{14}$, contact $j^{22}$, to contact $j^{17}$ and finger $c^{12}$, to armature $A^2$, as before. This combination is shown and found in Fig. 12, in which it will be seen that one motor is acting as a shunt-motor with a resistance in circuit with its field, while the other motor is a series motor, the resistance P being again in multiple with its low-resistance field. The negative side of the shunt-field is connected to the negative side of the series field, so as to insure a rapid building up of the shunt-motor. This also is preferably a transitory position.

The next change is effected at the position 6 of the control-switch, the only change being that finger $c^{13}$ engages contact $j^{19}$. This effects a short circuit of the field-coils $F^{2a}$, $F^{2b}$, $F^{2c}$, and $F^{2d}$ and resistance P by the connection from $c^9$ to $c^{13}$, $j^{19}$ and $j^{16}$ to finger $c^{11}$. This is shown in Fig. 13 as another transitory position at which the car is operated by the shunt-motor only, except that the ohmic resistance of the other armature is in circuit.

Figure 14:
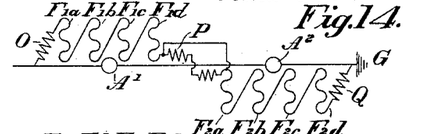

In passing from position 6 of the control-switch to position 7 thereof pin $f^2$ engages one of the triggers $e$, so that the segment E is moved and the $o$ fingers are upon line 22 of segment E. Also changes are made on the control-switch because finger $c^9$ loses engagement with contact $j^{13}$. Finger $c^{11}$ loses engagement with contact $j^{16}$, and finger $c^{12}$ loses engagement with $j^{17}$ and makes engagement with contact $j^{18}$. The effect of these changes is shown in Fig. 14, which is a running position. These changes may be summarized as follows:

First. Field-coils $F^{2a}$, $F^{2b}$, $F^{2c}$, and $F^{2d}$ are placed in series with each other, and this is of course effected by the movement of segment E. This same movement places in series with the field-coils the resistance Q, which is connected to finger $o^9$, which is connected by segment E to ground.

Second. It removes the short circuit across the $F^2$ field-coils, thereby placing $F'$ and $F^2$ field-coils in series with each other, and this it does because of the disengagement of fingers $c^9$ and contact $j^{13}$, which are the means previously present for short-circuiting the field.

Third. It maintains the connection between the two armatures even though the short circuit of the field is removed, because finger $c^{12}$ engages contact $j^{18}$, which by means of contact $j^{12}$ is in connection with finger $c^8$, fingers $c^8$ and $c^{12}$ being connected to the opposite terminals of the two armatures. At this position the resistance P, though connected in series between the two fields, is short-circuited by the fact that $c^{13}$ and $c^{14}$ are connected together by contacts $j^{19}$ and $j^{22}$.

Figure 15:
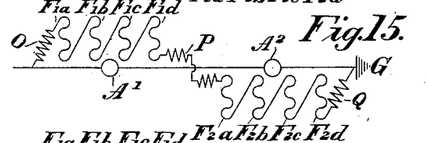

The only change made by passing to position 8 of the control-switch is shown in Fig. 15 when the short circuit around the resistance P is removed, so that the strength of the shunt-fields is weakened. This short circuit is removed because fingers $c^{13}$ and $c^{14}$ are no longer connected by any of the $j$ contacts. It may be noted at this point that both the positions shown in Figs. 14 and 15 may be used as running positions, the only difference being in the strength of the fields, as of course I prefer to have a stronger field at the first position, both because of its increased counter electromotive force, which will tend to cut down the current of the motor, and because of decreased speed due to the same cause.

Figure 16:
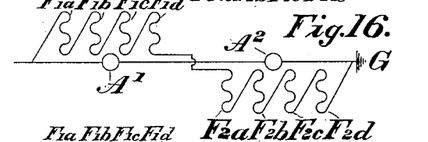
Figure 17:
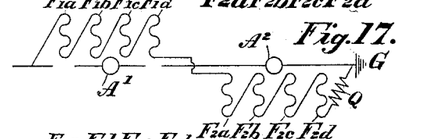

Fig. 16, while not, strictly speaking, one of the indicated positions of the controller, has been shown in a separate figure, because it represents a momentary change of considerable importance in the manipulation of an effective system of this kind. This figure represents a condition of the circuits which arises when the fingers $c'$ to $c^{14}$ are between positions 8 and 9 of the control-switch, so that the fingers are bridging. At this position fingers $c'$, $c^4$, $c^6$, $c^7$, $c^8$, $c^{12}$, $c^{13}$, and $c^{14}$ are respectively in engagement with contacts $j'$, $j^4$, $j^7$, $j^9$, $j^{12}$, $j^{18}$, $j^{20}$, and $j^{23}$. The effect of these changes, as will be readily seen without detailed information, is to short-circuit resistances O and P, so that the field strength of the motors will be suddenly increased, thereby increasing the counter electromotive force, so that when an instant later the circuit through the armatures is broken by disengagement of fingers $c^4$, $c^8$, and $c^{12}$, contacts $j^4$, $j^{12}$, and $j^{18}$, respectively, the increased counter electromotive force will tend to reduce the current flowing or in some conditions even supply a small counter-current, so as to prevent arcing on the controller-contacts. This position is shown at Fig. 17, which I prefer to use only as a transitory position.

Figure 18:
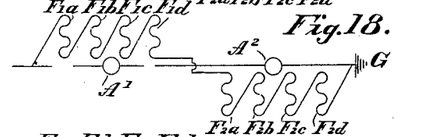

At the next position (position 10, shown in Fig. 18) the only change made is a short circuit of resistance Q, which is effected by engagement of fingers $c^{10}$ and $c^{11}$ with contacts $j^{14}$ and $j^{15}$. This is preparatory to putting the motors into multiple as shunt-motors, and as this change is a radical one the field strength is to be at its maximum.

Figures 19, 20:
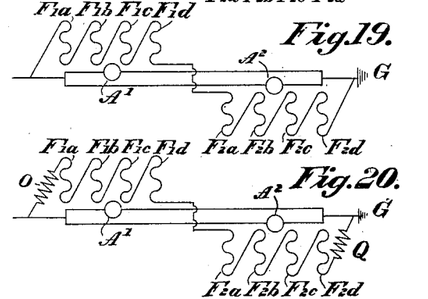

Position 11 is the first multiple position, and it is shown in Fig. 19. At this point finger $c^4$ makes contact with $j^5$, reëstablishing the circuit to $A'$, while finger $c^5$ makes contact with contact $j^6$, thus connecting $A^2$ directly to trolley and in multiple with $A'$. At the same position $c^8$ engages with $j^{11}$, by which means the connection is made from the negative side of $A'$ to ground through contact $j^{14}$ and finger $c^{10}$.

The next and last position (position 12, shown in Fig. 20) reintroduces resistances O and Q into the field-circuit, whereby the field strength is decreased, and consequently the counter electromotive force of the motors is also decreased, so that a higher speed may be attained.

The means which I have herein described makes it possible to combine the advantages of series and shunt motors, as will be readily seen, and provides a very efficient system of control. The provision of the auxiliary resistances and their manipulation in circuit, in conjunction with the changes in connection of the field-coil windings from multiple to series and in connection with the subsequent changes in the motor-circuit, enables the field strength to be accurately controlled to meet the varying conditions of the circuit and the running requirements.

I do not wish to limit myself to the particular embodiment of my invention which I have herein shown and described, as it is obvious that many changes may be made in the minor features thereof without departing from my invention as set forth in the following claims.

Having thus described my invention, what I claim, and desire to secure by Letters Patent, is—

1. The combination with an electric motor, of a controlling-switch provided with means for shifting the armature and field-coils of the motor from series to shunt or the reverse relation, and for changing substantially simultaneously therewith the field-magnet windings from a relation of low resistance to one of high resistance, or the reverse.

2. The combination with an electric motor having different field-windings, of a switch and connections for shifting the armature and field-coils of the motor from series to shunt or the reverse relation, said switch also having connections with the said field-windings whereby its operation to effect the above-described change in the armature and field-coils also changes the connection of the said windings from a relation of low resistance to a relation of high resistance.

3. The combination with an electric motor having its armatures and field-coils arranged to be connected either in series or in shunt, and its field-coil windings arranged for different resistance connections, of a switch for effecting automatically by movement thereof the series and shunt connections of the armature and field-coils, and for also shifting the connections of the field-coil windings.

4. The combination with an electric motor having its field-coils provided with a plurality of windings, of a switch having contacts and connections whereby as said switch is operated the said armature and coils are successively and automatically connected in both series and shunt relations to each other and the windings of said coils are automatically connected in both series and multiple relation.

5. The combination with an electric motor having its field-coils provided with a plurality of windings, of a controlling and field commutating-switch having contacts and connections whereby said field-windings may be first placed in series with the armature and upon further movement to automatically shift the field-coils and armature to shunt relation and also shift the circuit connections of the field-coil windings to increase their ohmic resistance.

6. The combination with a pair of electric motors, each of which has a plurality of field-coil windings and artificial resistance for connection in circuit with said windings, of a switch having contacts for connecting the armatures and field-coils of the motors in series and the field-coil windings all in multiple, and upon further movement to shift the armature and field-coils to shunt relation and the field-winding connections to series, and other contacts for controlling the connection and relation in circuit of said resistance, together with the necessary electrical connections.

7. The combination of an electric motor having a plurality of field-coil windings, and artificial resistance for connection in circuit with said windings, of a controlling-switch having contacts and electrical connections for connecting the said armature in series or in shunt with said windings, together with the necessary electrical connections.

8. The combination with an electric motor having a plurality of field-coil windings, and artificial resistance for connection in circuit with said windings, of a controlling-switch having a plurality of contacts whereby the said windings may be first placed in series with the armature and in multiple with each other and with the resistance, and subsequently, upon further movement of the switch, to shift the connections of the field-windings from multiple to series and the relation of said windings and the armature from series to shunt, and for connecting the resistance in series with said windings and also for short-circuiting the resistance.

9. The combination with a pair of electric motors having different sets of field-coil windings, of a controlling and field commutating-switch having contacts arranged to connect successively the armatures and field-coils in series with each other, the armatures in series and the field-coils in shunt thereto, and the armatures in multiple and the field-coils in shunt thereto, and other contacts operating automatically in connection with the first named to change the circuit connections of the field-coils from multiple to series.

10. The combination with a pair of electric motors having different sets of field-windings and different resistances for connection in circuit with said windings, of a controlling-switch having a plurality of movable contacts, arranged upon operation of the switch to first connect the armatures and field-coils all in series and the field-coil windings all in multiple, secondly to connect the field-coil windings all in series with each other and in shunt with the armatures and then to connect the armatures in multiple with the field-windings in series with each other and in shunt to the armature, and also having contacts for changing the connection in circuit with the field-windings of the said resistances and to short-circuit the same after the said windings have been placed in series with each other and in shunt to the armature.

11. The combination with an electric motor, of a controlling and field commutating-switch having one set of movable contacts arranged to connect the armatures and field-coils of the motors all in series, and then to shift the field-coils to in shunt with the armatures, and other sets of contacts for simultaneously changing the circuit connections of the field-coil windings to increase the strength of the fields proportionately to the increased voltage across the terminals of the motors.

12. The combination with an electric motor, of a controlling and field commutating-switch having one set of movable contacts arranged to connect the armatures and field-coils of the motors all in series, and then to shift the field-coils to in shunt with the armatures, and other sets of contacts for simultaneously changing the circuit connections of the field-coil windings to increase the strength of the fields proportionately to the increased voltage across the terminals of the motors, together with artificial resistance for connection in circuit with said field-coils, and other contacts on the switch for cutting out or short-circuiting the resistance subsequently to placing the motors in multiple as shunt-motors, said contacts, together with the necessary electrical connections, operating automatically by movement of the switch to effect the stated circuit changes.

13. The combination with a pair of electric motors having a plurality of field-windings and artificial resistance for connection in circuit therewith, of controlling and field commutating-switches having movable contacts arranged to first connect the motors as series motors, then to connect the motors as shunt-motors and finally to connect their armatures in parallel, and other contacts operating in connection with the first-named contacts to first connect the field-windings in multiple and then in series, and also to connect in circuit therewith the resistance.

14. The combination with a pair of electric motors having a plurality of field-windings and artificial resistance for connection in circuit therewith, of controlling and field commutating-switches having a plurality of movable contacts arranged upon movement of the switch to connect the armatures of the motors in both series and parallel and the field-coils in series or in shunt to the armatures, another set having its contacts arranged to connect the field-coil windings in multiple and in series, respectively, when the motors are connected as series or as shunt motors, and other contacts controlling the relation of the resistance to said field-windings whereby said resistance may be connected in multiple with the multiple field-windings, then in series with the series-connected field-windings, and subsequently short-circuited and again reconnected in series with the field-windings.

15. The combination with a pair of electric motors having different sets of field-windings, of a controlling and field commutating-switch provided with movable contacts arranged to first connect the motors as series motors and the field-windings thereof for low resistance and for subsequently connecting the motors as shunt-motors and the fields for high resistance, said changes being all automatically effected by movement of said switch.

16. The combination with a pair of electric motors having different sets of field-windings and artificial resistance for connection in circuit with said field-windings, of controlling and commutating switches having movable contacts relatively arranged to first connect the motors as series motors, then as shunt-motors, and finally with their armatures in parallel, and other contacts operating in connection with the first-named contacts to first connect the field-windings and resistance for low ohmic resistance and subsequently for high ohmic resistance and finally to control the artificial resistance to first decrease the ohmic resistance of the fields preparatory to connecting the armatures in multiple, and again, subsequently to the multiple connection, to increase the ohmic resistance of the fields.

17. The combination with a pair of electric motors having each different field-windings and artificial resistance for connection in circuit therewith, of a controlling and field commutating-switch having relatively-arranged movable contacts for connecting the motors as series motors with their field-windings in multiple with each other and with said resistance, and for subsequently, upon further movement of the switch to connect the field-windings of one motor in series with each other and with the resistance in shunt to the armature.

18. The combination with a pair of electric motors having each different field-windings and artificial resistance for connection in circuit therewith, of a controlling and field commutating-switch having relatively-arranged movable contacts, and electrical connections which first connect the motors as series motors with their field-windings in multiple with each other and with said resistance and to subsequently connect the field-windings in series with each other and with the resistance in shunt to the armature and also maintain at such time the series-multiple connection of the elements of the other motor.

19. The combination with a pair of electric motors each having a plurality of field-coil windings and artificial resistance for connection in circuit with said windings, of controlling and field commutating-switches having contacts which first connect the motors as series motors with the field-coil windings all connected in multiple with each other and with said resistance, and other contacts arranged relatively to the first-named contacts to subsequently shift the field-coils of one motor to in shunt with its armature and the windings of said coils to series connection with each other and to the negative side of the field-windings of the other motor.

20. The combination with a pair of electric motors each having a plurality of field-coil windings and artificial resistance for connection in circuit with said windings, of a controlling and field commutating-switch having contacts for connecting the motors as series motors with the field-coil windings all connected in multiple with each other and with said resistance, other contacts arranged respectively to the first-named contacts for subsequently shifting the field-coils of one motor to in shunt with its armature, and the windings of said coils to series connection with each other and to the negative side of the field-windings of the other motor, and other coöperating contacts which upon further operation of the switch short-circuit the field having the multiple-connected field-windings and then connect said windings in series with each other and in shunt to their armature, together with electrical connections whereby the described circuit changes are automatically effected.

21. The combination with a pair of electric motors having each a plurality of field-coil windings and artificial resistance for connection in circuit with said windings, of controlling and field commutating-switches having contacts for connecting the armatures in series and the field coils in shunt thereto with their windings all in series with each other and with the resistance, and other coöperating contacts for subsequently connecting the armatures in multiple, and still other contacts operating intermediately of the two sets of contacts first mentioned for short-circuiting the said resistance preparatory to connecting the armatures in multiple.

22. The combination with an electric motor having a plurality of field-coil windings, of a controller having contacts for changing the motor from a series to a shunt motor, and also field commutating-contacts operating relatively to the first-named contacts to change the field-coil-winding connections from multiple to series as the motors are changed from series to shunt motors.

23. The combination with electric motors having each a plurality of field-coil windings and artificial resistance for connection in circuit with said motors, of controlling and field commutating-switches having movable contacts for connecting the field-coils and armatures of the motors all in series with each other and with said resistance, contacts for gradually cutting out said resistance as the switch is further operated and other contacts for subsequently connecting the windings of both fields in series with each other and for shifting the field-coils to in shunt with the armatures.

24. The combination with a pair of electric motors whose field-coils are each provided with a plurality of windings and artificial resistance for connection in circuit therewith, of a switch having contacts for changing the circuit connections of the motor-armatures and field-coils as a whole and other contacts arranged to operate in conjunction with the first-named contacts to successively connect the field-coil windings all in multiple with each other and with the resistance, and other contacts for subsequently alternately changing the connection of said resistance to decrease and increase the ohmic resistance of the field-coils.

25. The combination with a pair of electric motors having their field-coils each provided with a plurality of field-windings, and artificial resistance for connection in circuit with said windings, of a controlling-switch having contacts for changing the circuit connections or relations of the motor-armatures and field-coils, and other connections operating in conjunction therewith, to first connect the field-coil windings of both motors all in multiple with each other and with said resistance and subsequently to shift the windings of the field-coils of one of the two motors to a series connection with each other and effect a connection between the negative side thereof and the negative side of the winding of the field-coil of the other motors, and still other contacts which by further movement of the switch connect the field-coil windings of the second motor all in series with each other and with those of the first motor.

26. The combination with a motor-controlling switch for varying the circuit connections of the motor elements as a whole, of a field commutating-switch for changing the circuit connections of the field-windings of the motor elements, and connections whereby the field-coil switch is operated automatically at predetermined positions of the controller-switch.

27. Means for controlling electric motors, comprising a switch for effecting a different connection of the motor elements as a whole, and a second switch for varying the circuit connections of the field-coil windings, and connections between said switches whereby the second switch is automatically operated by the operation of the first switch at predetermined positions of the latter.

28. The combination with a controlling-switch for varying the circuit connections of the motor elements as a whole, of a field commutating-switch, and gear connections between the two switches, arranged to operate the second switch by movement of the first at predetermined times.

29. Means for controlling a plurality of electric motors consisting of a switch for varying the circuit relations of the motor-armatures and field-coils, a field commutating-switch for the field-windings of each motor, and connections whereby the field commutating switch or switches are automatically operated at predetermined movements of the first-mentioned switch.

30. Means for controlling a pair of electric motors comprising a switch arranged to effect different circuit connections of the motor-armatures and field-coils, independent field commutating-switches, one for each motor, arranged to effect a different connection of the field-coil windings, and means whereby said field-coil switches are successively automatically operated at predetermined positions of the first-mentioned switch.

31. Means for controlling electric motors, having each a plurality of field-coil windings, comprising a rotary shaft carrying a series of contacts, a series of stationary brushes or fingers for engagement with said contacts and connected in circuit with the motor elements, and independently-mounted contacts, with corresponding brushes or fingers connected in circuit with the different windings of the field-magnet coils, together with connections whereby said independently-mounted contacts are actuated automatically upon predetermined movement of the said rotary shaft and its contacts.

32. Means for controlling electric motors, having each a plurality of field-coil windings comprising a rotary switch having contacts for effecting changes in the circuit connections of the motors, armatures and field-coils as a whole, and means for actuating said switch, of a shaft or post adjacent to said switch, a pair of segments sleeved to said shaft or post and provided with contacts arranged to differently connect in circuit the field-coil windings, gears actuated by the first-named switch and means carried by said segments for intermittent operative engagement with the said gears.

33. The combination with the rotary controlling-switch, of a shaft or support positioned adjacent thereto, a pair of switch-segments loosely sleeved to said shaft or support, gear-wheels actuated by the controlling-switch and having pins or projections, and springs connected to said segments and arranged to act in a position to either side of a position central to the operative positions of the segments.

34. The combination with the rotary controlling-switch, of a shaft or support adjacent thereto, a switch-segment loosely sleeved to the said shaft or support, gear-wheels actuated by said controller and having pins or projections, an arm on the segment arranged for intermittent engagement with said pins or projections, and a spring connected to the said segment to operate upon the same in different positions therefor.

35. In a controller for electric motors, the combination with a rotary switch arranged to change the motor-circuits, of a safety-switch connected in circuit between said controller and one side of the main line, said switch comprising one or more stationary terminals, coöperating movable terminals, a piston carrying said movable terminals, an electromagnet energized by or from the main circuit and acting on said piston to normally hold the safety-switch closed, a spring acting on said piston in opposition to the magnet, and a cam device on the shaft of the rotary switch arranged to impinge and act upon the said piston when the rotary switch is moved to off position.

In testimony whereof I have affixed my signature in presence of two witnesses.

BENNET CARROLL SHIPMAN.

Witnesses:
H. W. McKALIP,
W. F. SHROYER.